May 23, 1939.  C. C. WILLIAMS  2,159,465
SELECTIVE SPEED TRANSMISSION AND COASTER BRAKE
Filed Sept. 29, 1937  4 Sheets-Sheet 3
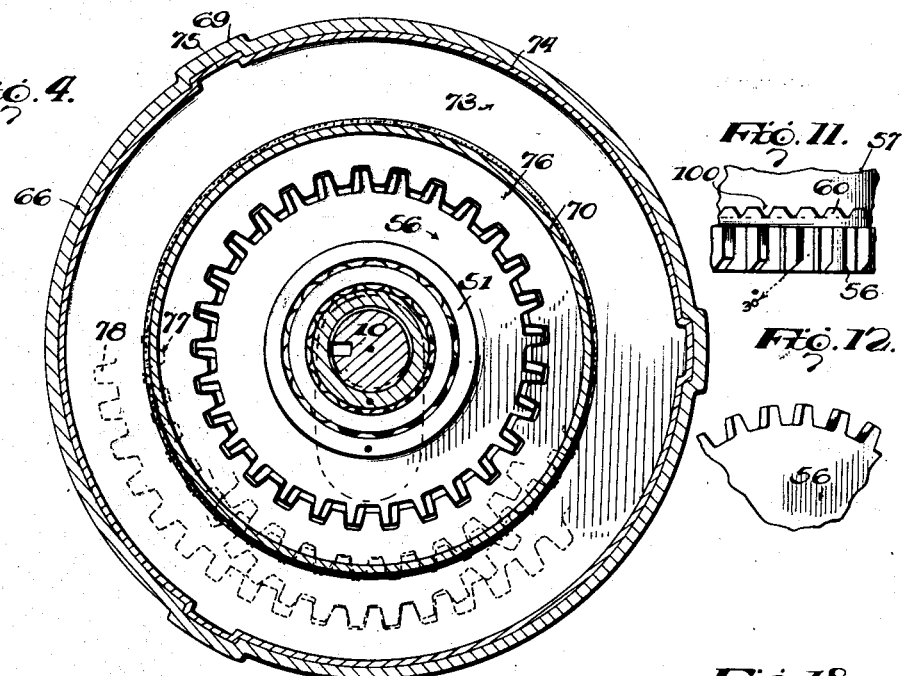
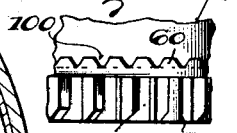
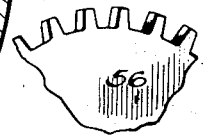
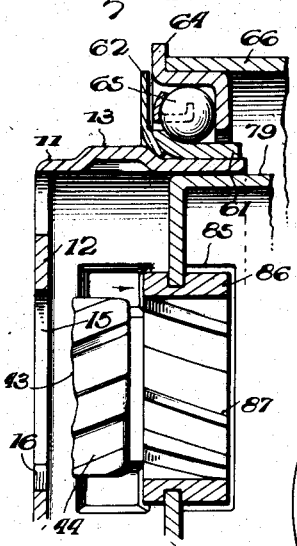
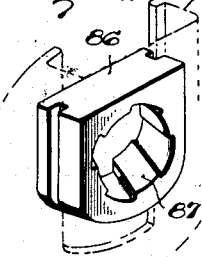
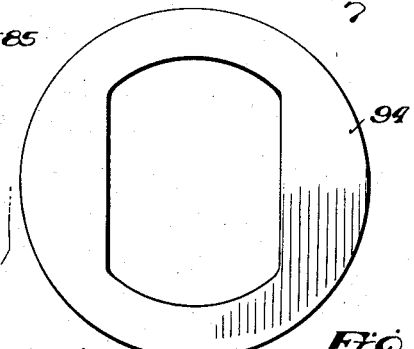
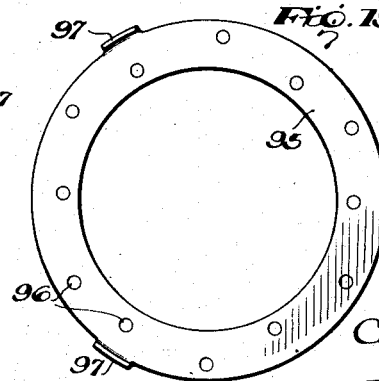
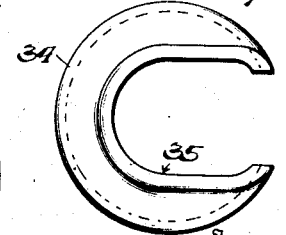
Inventor
Calvin C. Williams.
By Thos. H. Johnston
Attorney

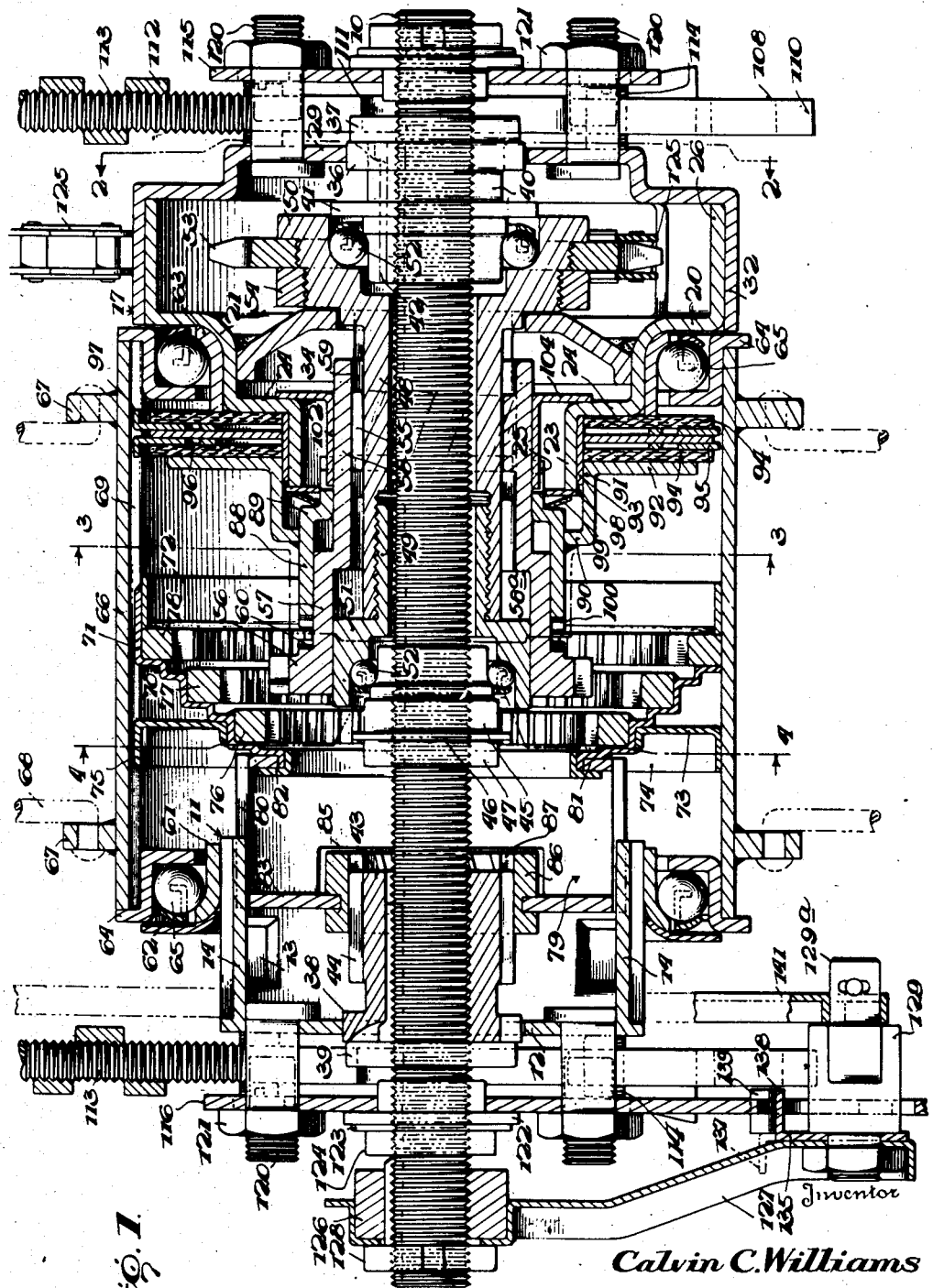

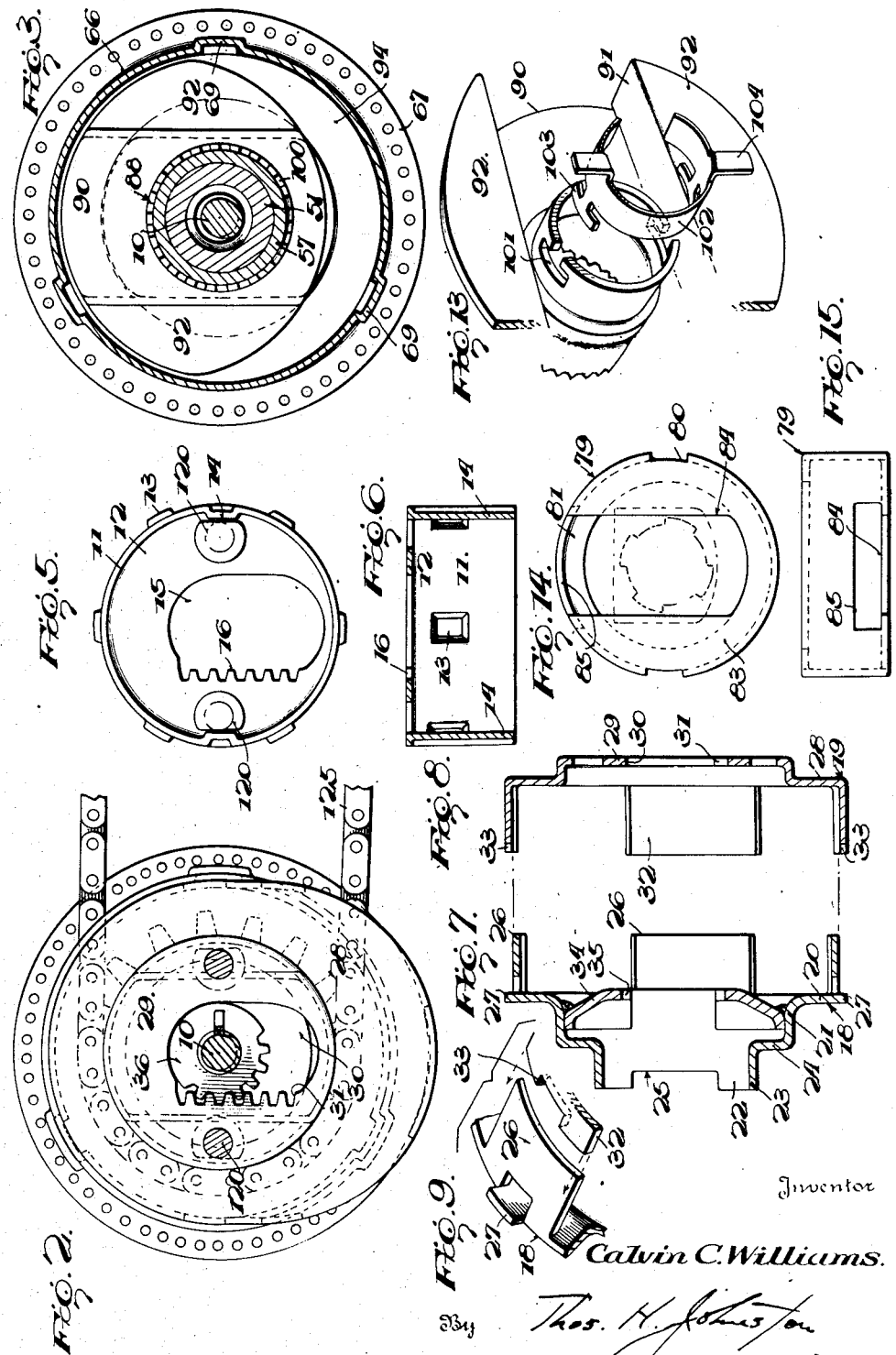

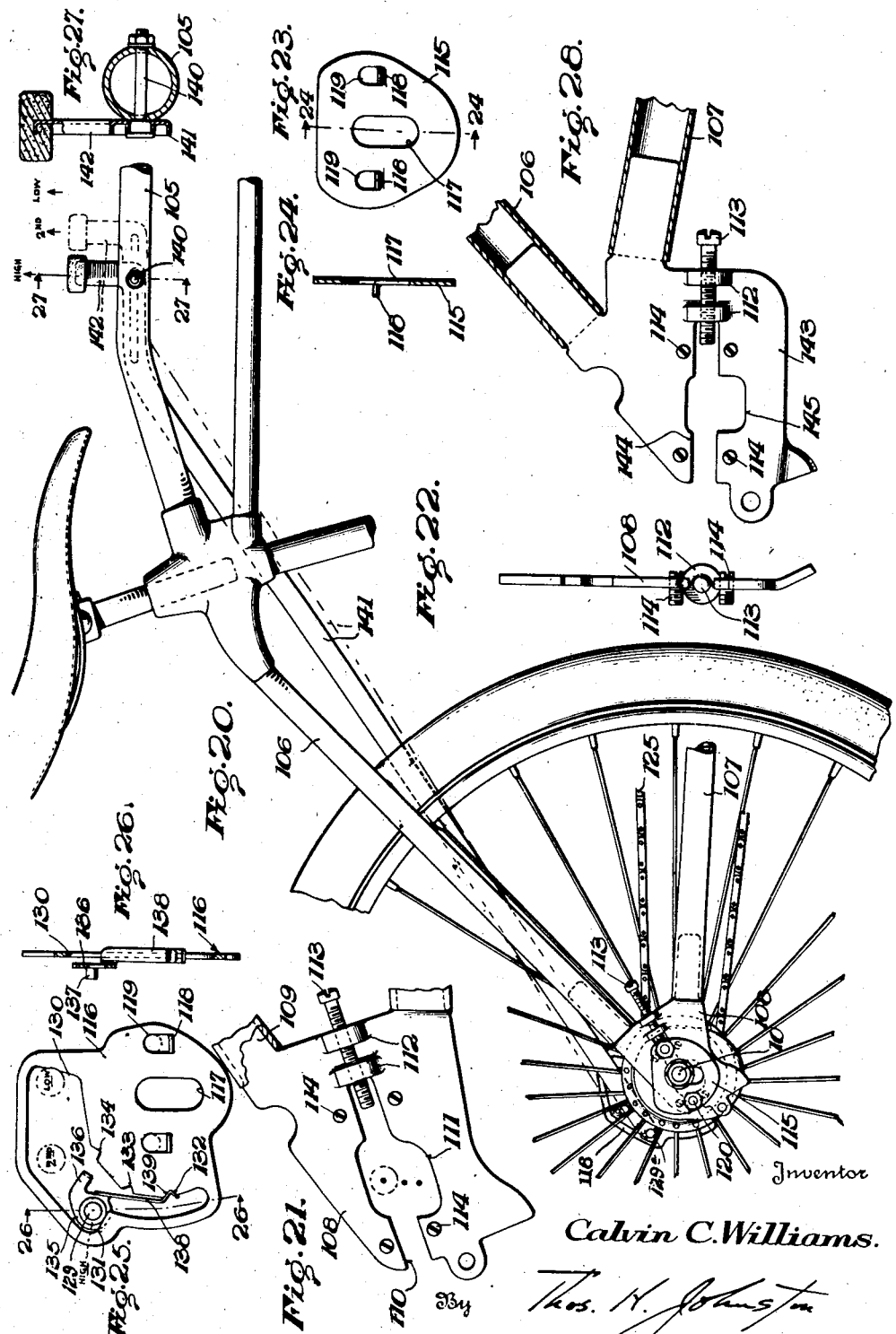

Patented May 23, 1939

2,159,465

UNITED STATES PATENT OFFICE 2,159,465

SELECTIVE SPEED TRANSMISSION AND COASTER BRAKE

Calvin C. Williams, Philadelphia, Pa.

Application September 29, 1937, Serial No. 166,455

23 Claims. (Cl. 192—6)

This invention relates to an improved selective speed transmission and coaster brake for bicycles and the like.

One of the objects of the invention is to provide a transmission and coaster brake which will be embodied in the rear wheel hub of the bicycle and wherein the selection of the speeds will be under convenient control of the operator.

A further object of the invention is to provide a mechanism wherein the speeds may be selected manually, and wherein by simply stopping the foot pedals, the parts will, when the bicycle is in motion, be automatically freed for the selection of any speed desired.

Another object of the invention is to provide a mechanism wherein the foot pedals may be stopped while any speed is active for permitting the bicycle to coast, and wherein, when the foot pedals are again actuated, the same speed formerly active will again become active.

A further object of the invention is to provide a mechanism wherein the brake may be applied by back-pedaling, and wherein the application of the brake will be under direct control of the pedals so that the brake will be applied with correspondingly increasing force as the force of back-pedaling is increased.

Still another object of the invention is to provide a mechanism wherein the sliding drive gear of the transmission will be utilized in applying the brake, wherein said gear will, by forward pedaling, be movable forwardly to active position, and wherein said gear will, by back-pedaling, be movable rearwardly for applying the brake.

A further object of the invention is to provide a mechanism wherein the hub will be compact, and wherein many of the parts will be formed of metal stampings, to thus facilitate economical manufacture.

And a still further object of the invention is to provide a mechanism readily adaptable to conventional bicycles and suited to the structure thereof as now built.

Other and incidental objects of the invention will appear during the course of the following description and in the drawings, Figure 1 is an enlarged sectional view through the wheel hub, the section being tilted upwardly somewhat from the horizontal.

Figure 2 is a transverse section on the line 2—2 of Figure 1.

Figure 3 is a transverse section on the line 3—3 of Figure 1.

Figure 4 is a transverse section on the line 4—4 of Figure 1.

Figure 5 is an elevation of the left fixed end-housing of the hub, as viewed in Figure 1.

Figure 6 is a section through the housing shown in Figure 5.

Figure 7 is a sectional view of one section of the fixed end-housing at the right hand end of the hub, as viewed in Figure 1.

Figure 8 is a sectional view of the other mating section of the end-housing at the right hand end of the hub, as viewed in Figure 1.

Figure 9 is a detail perspective view of portions of the housing sections seen in Figures 7 and 8.

Figure 10 is an elevation of the brake thrust plate of the housing section of Figure 7.

Figure 11 is a detail plan view particularly showing the teeth of the drive gear employed.

Figure 12 is a detail end view of the gear teeth shown in Figure 11.

Figure 13 is a detail perspective view particularly showing the brake band of the drive gear.

Figure 14 is an inverted elevation of the driven gear selector shell.

Figure 15 is a bottom plan view of the shell shown in Figure 14.

Figure 16 is an enlarged fragmentary section particularly showing the selector block employed.

Figure 17 is an inverted detail perspective view of the block shown in Figure 16.

Figure 18 is an elevation of one of the stationary brake rings.

Figure 19 is an elevation of one of the revolving brake rings.

Figure 20 is a fragmentary elevation showing the invention in conjunction with portions of a bicycle.

Figure 21 is a detail elevation of one of the yokes at the rear of the bicycle frame.

Figure 22 is an edge elevation of the yoke shown in Figure 21.

Figure 23 is an elevation of the side plate employed at the right hand end of the hub shaft, as viewed in Figure 1.

Figure 24 is a section on the line 24—24 of Figure 23.

Figure 25 is an elevation of the side plate employed at the left hand end of the hub shaft, as viewed in Figure 1.

Figure 26 is a section on the line 26—26 of Figure 25.

Figure 27 is a transverse section on the line 27—27 of Figure 20.

Figure 28 is an elevation showing a slightly modified form of bicycle frame yoke.

In carrying the invention into effect, I employ an axle shaft 10. At the left hand end of the shaft, as viewed in Figure 1, is a fixed cylindrical end-housing 11, open at its inner end and provided at its outer end with an end wall 12. This housing, which, preferably, is a metal stamping, is shown in detail in Figures 5 and 6 of the drawings and, as will be observed, the cylindrical wall of the housing is provided with a series of pressed circumferentially spaced knobs 13 while at opposite sides of the housing, said wall is similarly provided with a pair of longitudinal ribs 14. The end wall 12 of the housing is formed with an elongated opening 15 and at the rear side of said opening is a vertical rack 16.

At the right hand end of the shaft 10 is a fixed end-housing indicated as a whole in said figure of the drawings at 17. This housing is shown in detail in Figures 7, 8 and 9 of the drawings and is formed of mating inner and outer sections 18 and 19 each of which is preferably a metal stamping. At this point, it may be stated that the terms "right" and "left" as used herein will refer to the structure as viewed in Figure 1 of the drawings.

The section 18 of the housing 17 comprises an ovate end plate 20, the long axis of which is disposed vertically, and lying immediately at the front of said plate is an annular seat 21, whence the wall of the section is shaped to form a rectangular hub flange 22, the end walls of which are curved and the vertical parallel side walls 23 of which are flat. Vertical flat shoulders 24 are thus produced at opposite sides of the hub flange at its inner end throughout the length of the side walls 23, said shoulders being, in effect, offsets in the wall of the section. Formed in the lower end wall of the flange 22 is a notch 25 and projecting laterally from the plate 20 at the periphery thereof are preferably four equally spaced lugs 26. These lugs are circumferentially curved and struck from a pair of said lugs are oppositely disposed radial ears 27.

The section 19 of the housing 17 comprises an ovate end plate 28, like the plate 22, which is offset and carries a circular end wall 29. Formed in said end wall is an elongated opening 30, like the opening 15 in the housing 11, and at the rear side of the opening 30 is a vertical rack 31, like the rack 16. Projecting laterally from the plate 28 at the periphery thereof are equally spaced curved lugs 32 fitting over the lugs 26 of the section 18 mating therewith, and formed in a pair of the lugs 32 are notches 33 which receive the ears 27 so that the sections are thus locked against relative rotation.

Fitting the inner periphery of the seat 21 of the section 18 of the housing 17 is a cupped brake thrust plate 34, seen in detail in Figure 10 of the drawings. As will later appear, this plate also serves as a dust guard and formed in said plate is a vertical slot 35 which, as will also later appear, freely accommodates vertical movement of the shaft 10.

Keyed on the right hand end of the shaft 10 is a segmental gear 36 secured by a jam nut 37 to mesh with the rack 31 of the end-housing 17, as seen in Figure 2 of the drawings, and keyed to the left hand end of the shaft is a segmental gear 38 secured by a jam nut 39 to mesh with the rack 16 of the end-housing 11. Thus, as will be seen, when the shaft 10 is rotated, the gears 36 and 38 will roll along the racks 16 and 31 and shift the shaft vertically in the openings 15 and 30 of the housings 11 and 17. The gear 36 is provided with an elongated hub 40 which is formed with a flange 41 and terminates in a cone 42 while the gear 38 is formed with an elongated hub 43 on which is provided a quadruple left hand thread 44 of appropriate pitch. The purpose of this thread will later appear as will also the purpose of shifting the shaft 10 vertically relative to the housings 11 and 17.

Screwed on the left hand end portion of the shaft 10 is a cone 45 abutting which is a lock washer 46 for a jam nut 47 and freely revoluble about the shaft is a sprocket hub which is formed of mating sections 48 and 49 screwed together at their inner ends. At the outer ends of said sections are heads 50 and 51 and interposed between said heads and the cones 42 and 45 are ball bearings 52 supporting the sprocket hub for free turning movement. The sections of the sprocket hub are screwed together until the adjacent end of the section 48 tightly abuts the head 51 of the section 49 and it is now to be observed that the inner end of the head 50 is freely received in the slot 35 of the brake thrust plate 34 so that the plate closely confronts the adjacent radial face of said head to coact therewith. Screwed on the head 50 is a sprocket 53 secured by a nut 54 and formed on the hub section 48 is a quadruple left hand thread 55 of appropriate pitch.

Carried by the hub of the sprocket 53 is a drive gear 56 having an elongated hub 57 which slidably as well as rotatably fits the head 51 of the sprocket hub section 49 and, as will be observed, the hub 57 is offset to provide a sleeve 58 fitting about the thread 55 on the hub section 48, an internal shoulder 58a being provided at the forward end of said sleeve. Formed in said sleeve is a quadruple left hand thread 59 coacting with the thread 55. Thus, forward rotation of the sprocket hub through the medium of the sprocket 53 will initially serve to project the gear 56 axially forward to active position until the shoulder 58a strikes the rear face of the head 51 of the sprocket hub section 49 as well as rotate said gear with the sprocket hub. Conversely, when the sprocket 53 is stopped, forward rotative torque on the gear 56 will immediately serve to axially shift said gear rearwardly to inactive position. As shown in detail in Figures 11 and 12 of the drawings, the teeth of the gear are preferably beveled at their forward ends to facilitate engagement of said gear with the driven gears presently to be described and formed on the hub 57 at the base of the gear 56 is an annular series of rearwardly presented teeth 60.

Tightly surrounding the end-housing 11 is a fixed race ring 61 and fitting beneath the outer margin of said ring is a dust ring 62 which abuts the series of knobs 13 on the housing. Fitting the seat 21 of the end-housing 17 is a fixed race ring 63 and surrounding the rings 61 and 63 are movable race rings 64, substantially Z-shaped in cross section. Interposed between the fixed and movable race rings are ball bearings 65 and fitting between the outer margins of the rings 64 is a cylindrical hub casing 66 to which are welded or otherwise fixed spaced spoke rings 67 apertured to receive suitable spokes, as conventionally shown at 68. The hub casing 66 is preferably a metal stamping and pressed from the wall thereof, as particularly seen in Figure 3 of the drawings, are preferably three equally spaced longitudinal channels 69. As will be seen, the ball bearings 65 will support the casing 66 for free rotation and will be supported by the fixed end-housings 11 and 17 to carry all of the load.

Thus, the axle shaft 10 is entirely free and full floating.

Slidably fitting at its larger end within the hub casing 66 is a conical driven gear holder 70 and formed on the periphery of said holder are equally spaced lateral lugs 71 which slidably engage in the channels 69 of the hub casing. Welded to said lugs is a brace ring 72 which slidably fits within the casing 66 and fixed to the holder 70 near its smaller end is a guide ring 73. At its outer periphery, this guide ring is provided with a flange 74 which slidably fits within the hub casing 66 and formed in said flange are equally spaced ribs 75 which slidably engage in the channels 69 of said casing. Preferably, the gear holder 70, brace ring 72 and guide ring 73 are all metal stampings and while the gear holder is keyed to the casing by the lugs 71 and ribs 75 for rotatably driving said casing, still, the gear holder is, nevertheless, as will be perceived, slidable longitudinally of said casing. The gear holder 70 is stepped as well as offset between the steps and fixed in the spaced steps of said holder are the driven gears employed. In the present instance, I have shown three of said gears, comprising a high speed gear 76, a second speed gear 77 and a low speed gear 78, each of the gears being an internal gear ring.

Slidably fitting within the end-housing 11 is a selector shell 79, seen in detail in Figures 14 and 15 of the drawings. This shell is preferably a metal stamping and formed in the cylindrical wall thereof are grooves 80 accommodating the ribs 14 of the housing 11, so that the shell is thus locked against turning movement. At its inner end, the shell is formed with an annular flange 81 mating with the small end of the gear holder 70 and engaging behind said flange is a ring 82 fixed within the small end of the gear holder and rotatably connecting the selector shell thereto.

At its outer end, the selector shell 79 is provided with an end wall 83 in which is formed a vertical slot 84 and formed in the cylindrical wall of the shell adjacent the lower end of said slot is an opening 85. Mounted on the shell, as shown in detail in Figures 16 and 17 of the drawings, is a selector block 86 which is received through the opening 85 and is grooved at its side edges to slidably engage the side walls of the slot 84. Formed through the block is an opening to accommodate the hub 43 of the gear 38 and the wall of this opening is provided with a quadruple left hand thread 87 to coact with the thread 44 of said gear. Thus, the block 86 may shift on the selector shell with the rise and fall of the axle shaft 10 while, however, turning movement of the shaft and consequent rotation of the gear 38 will, as will be perceived, serve, through the medium of the threads 44 and 87, to shift the block axially of the shaft. As a consequence, the selector shell 79 will be moved coincident with the rotation of the axle shaft 10 to shift the gear holder 70 within the hub casing 66 for selecting the gears 76, 77 and 78 for engagement by the drive gear 56.

Figure 1 of the drawings shows the shaft 10 at the top of its throw, in which position of the shaft, the drive gear 56 is disposed in concentric relation to the high speed driven gear 76 while the selector block 86 is disposed at the limit of its inward movement. In this position of the block, the gear holder 70 has been moved inwardly within the hub casing 66 to select the gear 76 and dispose said driven gear in position for engagement by the drive gear when driving torque is applied thereto. Consequently, when the sprocket 53 is rotated forwardly, the gear 56 will, as previously described, be shifted forwardly into mesh with the gear 76 for driving the hub casing 66 at high speed.

Assuming now that the parts are in the position shown in Figure 1 and it is desired to select second speed, the shaft 10 is rotated forwardly and, as previously described, thus caused to drop to second speed position. As the shaft falls and the gear 38 is turned, the selector block 86 will be shifted outwardly in the manner also previously described and the gear 77 moved into position for engagement by the drive gear 56 when rotated forwardly. In Figure 4 of the drawings, I have shown, in dotted lines, the position of the parts when the drive gear is engaged with the second speed gear 77 and as the driven gear is somewhat larger in diameter than the drive gear, a reduction is had and the hub casing 66 will be rotated forwardly at second speed.

To select low speed, the shaft 10 is still further rotated forwardly from second speed position and thus caused to drop to low speed position. As the shaft is rotated, the block 86 will be further shifted outwardly and the gear 78 moved into position for engagement by the drive gear 56. Figure 4 also shows, in dotted lines, the low speed position of the parts and as the driven gear 78 is considerably larger in diameter than the drive gear, the hub casing 66 will be driven forwardly at low speed.

The three speeds, namely, high, second and low, may thus be selected at will simply by rotatably positioning the axle shaft 10 and, in this connection, it is to be noted that as the drive gear 56 normally stands retracted out of the plane of any selected driven gear, the shaft 10 may, at any time, be freely moved to select another gear. Furthermore, it is to be noted that when any gear is being driven by the drive gear 56 and the sprocket 53 is stopped, forward rotation of the selected driven gear by the momentum of the hub casing 66 will immediately serve to throw out the drive gear to normal inactive position. Thus, the drive gear will be automatically rendered inactive before the coaster brake is applied by counter-rotation of the sprocket, as shall now be described.

Slidably fitting the hub 57 of the drive gear 56 is a brake shoe comprising a sleeve 88 offset near its outer end to fit the sleeve 58 of the gear hub and this offset provides an annular shoulder 89. Welded or otherwise fixed to the sleeve 88 is, as particularly seen in Figures 3 and 13 of the drawings, an eccentrically disposed ovate head 90 having spaced vertical flanges 91 which freely straddle the vertical side walls 23 of the hub flange 22 of the end-housing 17 and formed on said flanges are lateral semi-elliptic pressure plates 92. As will be perceived, the head 90 with its flanges 91 and pressure plates 92 is so shaped and arranged that the brake shoe may freely rise and fall with the shaft 10 and, in this connection, it is to be noted that the notch 25 in the hub flange 22 of the end-housing 17 is provided to afford clearance for the outer end of the sleeve 88 when the axle shaft is in its lowermost position.

Overlying the side walls 23 of the hub flange 22 of the end-housing 17 are wear plates 93 and fitting said flange to overlie said plates is a plurality of stationary brake rings 94, one of which is shown in detail in Figure 18 of the drawings. The outermost of said rings is seated against the flat vertical shoulders 24 of the end-housing so that these shoulders thus provide an abutment therefor while the innermost of said rings confronts the pressure plates 92 of the brake shoe for engagement thereby and as the rings may move axially of the flange 22, the plates 93 are provided to obviate wear of said flange as well as prevent the rings 94 from embedding into the walls 23 of the flange 22 when the brake is applied. Interposed between the stationary brake rings are revoluble brake rings 95, one of which is shown in detail in Figure 19 of the drawings. These rings are each provided with spaced openings 96 and formed on the periphery thereof are equally spaced lateral lugs 97 which engage in the channels 69 of the hub casing 66. Accordingly, the rings 95 are mounted to turn with the casing. Abutting the end edge of the hub flange 22 of the housing 17 is a stop ring 98 and interposed between said ring and the shoulder 89 of the sleeve 88 of the brake shoe is a cupped spring ring 99 for retracting the shoe and normally holding the shoe retracted.

Formed on the inner end of the sleeve 88 of the brake shoe is an annular series of teeth 100 which, as seen in Figure 11, are engageable by the teeth 60 of the drive gear 56 and formed in the outer end of said sleeve, as shown in detail in Figure 13, are diametrically disposed T-shaped slots 101. Detachably connected to the sleeve is a split resilient brake band 102 which is gripped about the sleeve 58 of the hub of the drive gear to frictionally coact therewith and formed on the inner edge of said band are oppositely disposed T-shaped lugs 103 engaged in the slots 101 for connecting the brake band with the sleeve 88. Formed on the outer edge of the brake band 102 are oppositely disposed L-shaped lugs 104, the free ends of which engage behind the flat vertical shoulders 24 of the end-housing 17 and are movable along said shoulders with the rise and fall of the axle shaft 10. Thus, these lugs will limit the inward movement of the sleeve 88 of the brake shoe under the influence of the retracting spring 99.

Assuming now that the sprocket 53 is stopped, the drive gear 56 will, as previously described, be immediately shifted axially to inactive position so that the bicycle may freely coast and, as will be noted, spinning of the drive gear will be immediately counteracted by the brake band 102. The brake band will thus forestall free unrestrained movement of said gear. Assuming further that the sprocket is rotated backwards, it will be seen that the thread 55 in the section 48 of the sprocket hub will coact with the thread 59 of the drive gear for shifting the drive gear rearwardly to engage the teeth 60 of said gear with the teeth 100 of the sleeve 88 of the brake shoe. Consequently, as the flanges 91 of the head 90 coact with the wear plates 93 for locking the brake shoe against rotation, the teeth 100 will coact with the teeth 60 for locking the drive gear against rotation so that continued counter rotation of the sprocket will serve to shift the drive gear further rearward and force said sleeve outwardly on the drive gear hub. As a result, the pressure plates 92 of the brake shoe will be caused to exert a pressure on the brake rings 94 and compress said rings into frictional engagement with the revolving rings 95 for exerting a braking action on the hub casing 66. As will be observed, the rearward movement of the drive gear 56 is mechanically controlled through the medium of the threads 55 and 59 and as said drive gear, being locked against rotation, will thus exert a pressure on the plates 92 in direct proportion to the backward pressure exerted on the sprocket 53, the braking action is, as shall later appear, directly controlled by the foot pedals, the energy with which the brake is applied being in direct response to the back-pedaling force exerted on said pedals. Upon the relief of the counter-rotating force on the sprocket 53, the spring 99 will, of course, shift the brake shoe forwardly, as previously described, and release the brake and, as will be appreciated, dragging of the brake will be effectually obviated.

In the present instance, I have shown the use of a plurality of brake rings 94 and 95 but the exact number employed may, of course, be determined by expediency. It is to be noted, however, that when the brake is applied, oil in the casing 66 will be forced into the openings 96 of the rings 95 to afford a hydraulic cushioning effect while also, said openings will provide pockets into which the oil may escape, as the brake is applied, so that the rings will be quickly freed or dried of excess oil and thus quickly afford an effective braking action. When the brake is released, the oil trapped in said openings will not only gravitate between the rings but will also be distributed by centrifugal force to again lubricate the rings and avoid burning or abrasion thereof when not in use. The thrust plate 34 serves not only as a dust guard between the sprocket 53 and the interior of the hub casing but also serves, as will now be appreciated, as a brace for the section 18 of the end-housing 17 under the thrust created by the application of the brake. Such end thrust will be distributed through said plate to the sprocket hub and so absorbed.

In Figure 20 of the drawings, I have shown a portion of the frame of a bicycle embodying the usual cross bar 105, rear strut tubes 106 and horizontal brace tubes 107. Connecting the meeting ends of the tubes 106 and 107 is a pair of yoke plates 108, one of which is shown in detail in Figure 21 of the drawings. These plates are provided with diverging trunnions 109 which are fixed in the ends of the tubes 106 and 107 and formed in said plates are inclined slots 110 medially of which are provided vertically elongated openings 111. Struck from the plates at the upper ends of the slots 110 are bearings 112 and screwed through said bearings are set bolts 113. The yoke plates 108 are further equipped with inner and outer pairs of set screws 114 disposed at opposite sides of the slots 110.

As seen in Figure 1 of the drawings, the slots 110 of the yoke plates 108 are adapted to more or less snugly receive the ends of the axle shaft 10 so that the hub as an entirety may be readily installed between said plates and, of course, the ends of said shaft are freely accommodated in the openings 111 which are of a length to freely accommodate the rise and fall of the shaft, the lateral centering of the hub being adjusted and rigidly fixed by means of the pairs of set screws 114 adjustable to engage the end-housings 11 and 17. Overlying the yoke plates 108 are right and left side plates 115 and 116, the right side plate being shown in detail in Figures 23 and 24 of the drawings and the left side plate being shown in detail in Figures 25 and 26. These plates are formed with vertical slots 117 to freely accommodate the ends of the axle shaft 10 and struck from said plates are lateral lugs 118 engaging the bottom walls of the slots 110 of the yoke plates for positioning the side plates thereon. Openings 119 are thus provided in the side plates and extending through said openings, through the slots 110 of the yoke plates and through the end walls 12 and 29 of the end-housings 11 and 17 are pairs of cap bolts 120. These bolts are preferably provided with flat sides to obviate turning thereof and screwed on said bolts are nuts 121 rigidly securing the hub in position between the yoke plates 108. Screwed on the axle shaft 10 to be freely received through the slots 117 of the side plates 115 and 116 are cap nuts 122 overlying which are lock washers 123 and screwed on the shaft to coact with said washers are jam nuts 124. Thus, the axle shaft will be limited against endwise movement.

I have deemed it unnecessary to show the sprocket wheel of the bicycle. As will be understood, however, this wheel is operated by the foot pedals, also not shown, and trained about said wheel and about the sprocket 53 is a sprocket chain 125 freely received between the pairs of mating lugs 26 and 32 of the sections 18 and 19 of the end-housing 17. As will be observed, those of the bolts 120 which are positioned forwardly are disposed for engagement by the set bolts 113 so that the bolts 113 may be adjusted for adjusting the tightness of the chain. Thus, the sprocket 53 may be operated by the foot pedals of the bicycle and will be directly controlled by said pedals. As the pedals are operated forwardly, the bicycle will, as will now be understood, be propelled forwardly and when operated rearwardly, the brake will be applied while, when the pedals are stopped, the bicycle may coast.

Keyed on the left hand end of the axle shaft 10 is a nut 126 fitting which is a lever 127 and securing the lever in position is a nut 128. Fixed to the free end of the lever is a stud 129 and projecting from the outer end of said stud is a trunnion 129a. Formed in the side plate 116 to freely accommodate the stud 129 is a more or less arcuate opening 130 which, as seen in detail in Figure 25 of the drawings, is reduced at its rear end portion to provide a shoulder 131 and formed on the bottom wall of said opening are spaced notches 132, 133 and 134 respectively.

Clamped between the stud 129 and the free end of the lever 127 is a spring latch 135, shown more particularly in Figures 25 and 26 of the drawings. Formed on the head of the latch is an extension 136 carrying a lateral lug 137 and, as brought out in Figure 1 of the drawings, this lug is engaged beneath the lever 127 for limiting the latch against turning movement.

The latch 135 is also formed with a spring arm 138 disposed laterally to ride at its free end against the bottom wall of the opening 130 in the plate 116 and formed on the free end of said arm is a V-shaped pawl 139 adapted to selectively engage in the notches 132, 133 and 134 of said plate. Thus, when the axle shaft 10 is elevated to select high gear, as previously described, and the lever 127 is swung to its rearmost position, the stud 129 will abut the shoulder 131 of the side plate 116, as shown in Figure 25 of the drawings, while the pawl 139 will engage in the notch 132 of said plate for locking the shaft in selected elevated high speed position. Similarly, when the lever 127 is swung forwardly to lower the axle shaft 10 and select second speed, the pawl 139 will engage in the notch 133 for locking the shaft in intermediate second speed position while, when the lever is still further swung forwardly to lower the shaft 10 and select low speed, the stud 129 will abut the forward end wall of the opening 130 in the side plate 116 while the pawl 139 will engage in the notch 134 for locking the shaft in low speed position. Thus, the axle shaft 10 will be automatically locked in any one of its three positions so that any gear selected will be consequently locked active.

Extending through the cross bar 105 of the bicycle frame, as shown in detail in Figure 27 of the drawings, is a bolt 140 and slidable on the head of said bolt is a control rod 141 provided at its forward end with an upturned handle 142 carrying a suitable knob, while at its rear end, said rod is, as seen in Figure 1 of the drawings, pivotally connected to the trunnion 129a of the stud 129 of the lever 127. As will be seen, this rod provides a means whereby the lever 127 may be swung to raise and lower the axle shaft 10 for selecting the different speeds and by grasping the handle 142, the rider of the bicycle may conveniently shift the rod at any time to select the speed desired.

In Figure 28 of the drawings, I have shown a slightly modified form of yoke plate 143 which, in all substantial respects, is identical with the plates 108 except that the plate 143 is provided with a horizontal slot 144 and vertical opening 145 at a right angle to said slot to receive the axle shaft 10, instead of the inclined slot 110 and opening 111 first described. For certain makes of bicycle, the yoke plate 143 will be found more suitable.

Having thus described the invention, I claim:

1. Mechanism of the class described including fixed end-housings, a hub casing rotatably supported thereby, a driven gear connected with the casing for rotating the same, a rotatable axle shaft extending through said housings and the casing and mounted for floating movement relative thereto, a drive gear carried by the shaft, and means for shifting the shaft as it is rotated and positioning the drive gear for engagement with the driven gear.

2. Mechanism of the class described including fixed end-housings, a hub casing rotatably supported thereby, a driven gear shiftable within the casing but connected therewith for rotating the casing, a rotatable axle shaft extending through said housings and the casing and mounted for floating movement relative thereto, a drive gear carried by the shaft, and means for shifting the shaft as it is rotated and positioning the drive gear as well as positioning the driven gear for selective engagement by the drive gear.

3. Mechanism of the class described including fixed end-housings, a hub casing rotatably supported thereby, a drive gear shiftable within the casing but connected therewith for rotating the casing, a rotatable axle shaft extending through said housings and the casing and mounted for floating movement relative thereto, a drive gear carried by the shaft, coacting means carried by the shaft and said housings for shifting the shaft as it is rotated and positioning the drive gear, and means movable by one of said first-mentioned means for positioning the driven gear for selective engagement by the drive gear.

4. Mechanism of the class described including fixed end-housings, a hub casing rotatably supported thereby, a driven gear connected with the casing for rotating the same, a rotatable axle shaft extending through said housings and the casing and mounted for floating movement relative thereto, an axially movable drive gear carried by the shaft, means for shifting the shaft as it is rotated and positioning the drive gear for engagement with the driven gear, and means operable by driving torque for shifting the drive gear axially into engagement with the driven gear.

5. Mechanism of the class described including fixed end-housings, a hub casing rotatably supported thereby, a driven gear connected with the casing for rotating the same, a rotatable axle shaft extending through said housings and the casing and mounted for floating movement relative thereto, an axially movable drive gear carried by the shaft, means for shifting the shaft as it is rotated and positioning the drive gear for engagement with the driven gear, and means operable by driving torque for shifting the drive gear axially into engagement with the driven gear as well as operable by rotation of the driven gear when said torque is relieved for axially shifting the drive gear out of engagement with the driven gear to inactive position.

6. Mechanism of the class described including fixed end-housings, a hub casing rotatably supported thereby, a driven gear connected with the casing for rotating the same, a rotatable axle shaft extending through the housings and the casing and mounted for floating movement relative thereto, a rotatable sprocket hub carried by said shaft, an axially movable drive gear carried by said sprocket hub, means for shifting the shaft as it is rotated and positioning the drive gear for engagement with the driven gear, and coacting means carried by the drive gear and said sprocket hub for shifting the drive gear axially into engagement with the driven gear upon the application of driving torque to the sprocket hub.

7. Mechanism of the class described including fixed end-housings, a hub casing rotatably supported thereby, a driven gear connected with the casing for rotating the same, a rotatable axle shaft extending through the housings and the casing and mounted for floating movement relative thereto, a rotatable sprocket hub carried by said shaft, an axially movable drive gear carried by said sprocket hub, means for shifting the shaft as it is rotated and positioning the drive gear for engagement with the driven gear, and coacting means carried by the drive gear and said sprocket hub for shifting the drive gear axially into engagement with the driven gear upon the application of driving torque to the sprocket hub and operable by rotation of the driven gear when said torque is relieved for axially shifting the drive gear out of engagement with the driven gear to inactive position.

8. Mechanism of the class described including fixed end-housings, a hub casing rotatably supported thereby, a driven gear connected with the casing for rotating the same, an axle shaft extending through said housings and the casing, a drive gear carried by said shaft and engageable with the driven gear, and means operable by the torque of the driven gear for shifting the drive gear out of engagement therewith and releasing the hub casing for free turning movement.

9. Mechanism of the class described including fixed end-housings, a hub casing rotatably supported thereby, a driven gear connected with the casing for rotating the same, an axle shaft extending through said housings and the casing, a rotatable sprocket hub carried by said shaft, a drive gear carried by said hub and engageable with the driven gear, and coacting means carried by the hub and said drive gear and responsive to driving torque on the hub for shifting the drive gear into engagement with the driven gear as well as responsive to driving torque of the driven gear for shifting the drive gear out of engagement with the driven gear and releasing the hub casing for free turning movement.

10. Mechanism of the class described including fixed end-housings, a hub casing rotatably supported thereby, a driven gear connected with the casing for rotating the same, a rotatable axle shaft extending through said housings and the casing and mounted for floating movement relative thereto, a rotatable sprocket hub carried by said shaft, a drive gear carried by said hub, means for shifting the shaft as it it rotated and positioning the drive gear for engagement with the driven gear, and coacting means carried by the hub and said drive gear and responsive to driving torque on the hub for shifting the drive gear into engagement with the driven gear as well as responsive to driving torque of the driven gear for shifting the drive gear out of engagement with the driven gear and releasing the hub casing for free turning movement.

11. Mechanism of the class described including fixed end-housings, a hub casing rotatably supported thereby, a driven gear shiftable within the casing but connected therewith for rotating the casing, a rotatable axle shaft extending through said housings and the casing and mounted for floating movement relative thereto, a rotatable sprocket hub carried by the shaft, a drive gear carried by said hub, coacting means carried by the shaft and said housings for shifting the shaft as it is rotated and positioning the drive gear, means movable by one of said coacting means for positioning the driven gear for selective engagement by the drive gear, and coacting means carried by the hub and said drive gear and responsive to driving torque on the hub for shifting the drive gear into engagement with the driven gear as well as responsive to driving torque of the driven gear for shifting the drive gear out of engagement with the driven gear and releasing the hub casing for free turning movement.

12. Mechanism of the class described including fixed end-housings, a hub casing rotatably supported thereby, a driven gear connected with the casing for rotating the same, a rotatable axle shaft extending through said housings and the casing and mounted for floating movement relative thereto, a drive gear carried by the shaft, and means fixed to the shaft to coact with the end-housings for shifting the shaft as it is rotated and positioning the drive gear for engagement with the driven gear.

13. Mechanism of the class described including fixed end-housings, a hub casing rotatably supported thereby, a driven gear shiftable within the casing but connected therewith for rotating the casing, an axle shaft extending through said housings and the casing and mounted for floating movement relative thereto, a drive gear carried by the shaft, gears fixed to the shaft to coact with the end-housings for shifting the shaft as it is rotated and positioning the drive gear, one of the shaft gears being provided with a hub having a thread thereon, and a block having a thread coacting with the thread of said gear hub and operatively connected with the driven gear for positioning the driven gear for selective engagement by the drive gear as the shaft is rotated.

14. Mechanism of the class described including fixed end-housings, a hub casing rotatably supported thereby, a gear holder slidable within the casing but connected therewith for rotating the casing, a driven gear fixed on said gear holder, an axle shaft extending through said housings and the casing and mounted for floating movement relative thereto, a drive gear carried by the shaft, gears fixed on the shaft to coact with the end-housings for shifting the shaft as it is rotated and positioning the drive gear, a selector shell slidable in one of said end-housings and connected to said gear holder, a slidable block carried by said shell, and coacting means carried by one of the shaft gears and said block for shifting the block and shifting the driven gear as the shaft is rotated to position the driven gear for selective engagement by the drive gear.

15. Mechanism of the class described including fixed end-housings, a hub casing rotatably supported thereby, a driven gear connected with the casing for rotating the same, an axle shaft extending through said housings and the casing, brake mechanism for the casing, and a drive gear carried by said shaft and movable in one direction thereon to engage the driven gear and in the opposite direction for rendering the brake mechanism active.

16. Mechanism of the class described including fixed end-housings, a hub casing rotatably supported thereby, a driven gear connected with the casing for rotating the same, an axle shaft extending through said housings and casing, a stationary brake ring carried by one of said housings, a movable brake ring connected with said casing to turn therewith and mounted to coast with the stationary ring, a brake shoe carried by the shaft, and a drive gear mounted on the shaft and movable thereon in one direction to engage said driven gear and in the opposite direction to shift said shoe and urge the stationary ring to frictionally coact with the movable ring.

17. Mechanism of the class described including fixed end-housings, a hub casing rotatably supported thereby, a driven gear connected with the casing for rotating the same, an axle shaft extending through said housings and the casing, a stationary brake ring carried by one of said housings, a movable brake ring connected with the casing to turn therewith and mounted to coact with the stationary ring, a brake shoe, a drive gear carried by the shaft and mounting said shoe, the drive gear being movable on the shaft in one direction to engage the driven gear and in the opposite direction for shifting said shoe and urging the stationary ring to coact with the movable ring, and a brake band connected with the shoe and frictionally coacting with the drive gear for restraining free turning movement thereof.

18. Mechanism of the class described including fixed end-housings, a hub casing rotatably supported thereby, a driven gear connected with the casing for rotating the same, an axle shaft extending through said housings and the casing, a stationary brake ring carried by one of said housings, a movable brake ring connected with the casing to turn therewith and mounted to coact with the stationary ring, a brake shoe, a drive gear carried by the shaft and mounting said shoe, the gear being movable on the shaft in one direction to engage the driven gear and in the opposite direction for shifting said shoe and urging the stationary ring to coact with the movable ring, yieldable means urging the shoe to free the brake rings, and means limiting the shoe under the action of said yieldable means and frictionally coacting with the drive gear for restraining free rotative movement thereof.

19. Mechanism of the class described including fixed end-housings, a hub casing rotatably supported thereby, a driven gear connected with the casing for rotating the same, an axle shaft extending through said housings and the casing, a sprocket hub revoluble on said shaft, a drive gear carried by said hub, brake mechanism for the casing including a shoe slidable on said drive gear but locked against rotation, the drive gear being axially movable in one direction to engage the driven gear and in the opposite direction to shift the shoe and apply the brake, coacting means carried by the shoe and said gear for locking the gear against rotation when engaged with the shoe, and coacting means carried by the sprocket hub and said drive gear and operable to axially shift said gear in opposite directions selectively.

20. Mechanism of the class described including fixed end-housings, a hub casing rotatably supported thereby, a driven gear connected with the casing for rotating the same, a rotatable axle shaft extending through said housings and the casing and mounted for floating movement relative thereto, a sprocket hub mounted to revolve on said shaft, a drive gear carried by said hub, coacting means carried by the shaft and said housings for shiftings the shaft as it is rotated and positioning the drive gear for engagement with the driven gear, brake mechanism for the casing including a brake shoe slidable on the drive gear but locked against rotation, the drive gear being axially movable in one direction to engage the driven gear and in the opposite direction to shift the shoe and apply the brake, coacting means carried by the shoe and said gear for locking the gear against rotation when engaged with the shoe, and coacting means carried by the sprocket hub and the drive gear and operable to axially shift said gear in opposite directions selectively.

21. In a bicycle or the like, the combination of drive mechanism including an axially movable drive gear and a driven gear, brake mechanism, and means for shifting the drive gear axially in one direction to engage the driven gear when the drive gear is propelled forwardly and axially in the opposite direction to render the brake mechanism active when rearward propelling force is applied to the drive gear.

22. Mechanism of the class described including a floating axle shaft, speed gears, means for driving said gears, means for elevating or lowering the shaft, means operable by the movement of the shaft for selecting a speed gear, and means mounting the shaft for floating movement.

23. In a bicycle or the like, the combination of a floating axle shaft, speed gears, means for driving said gears, brake mechanism operable by said means, means for elevating or lowering the shaft, means operable by the movement of the shaft for selecting a speed gear, and means mounting the shaft for floating movement.

CALVIN C. WILLIAMS.